April 8, 1969　　　D. MANFREDI ET AL　　　3,437,285
SPACE VEHICLE AND LAUNCHING MEANS THEREFOR
Filed Aug. 4, 1966　　　　　　　　　　　　　　Sheet 1 of 3
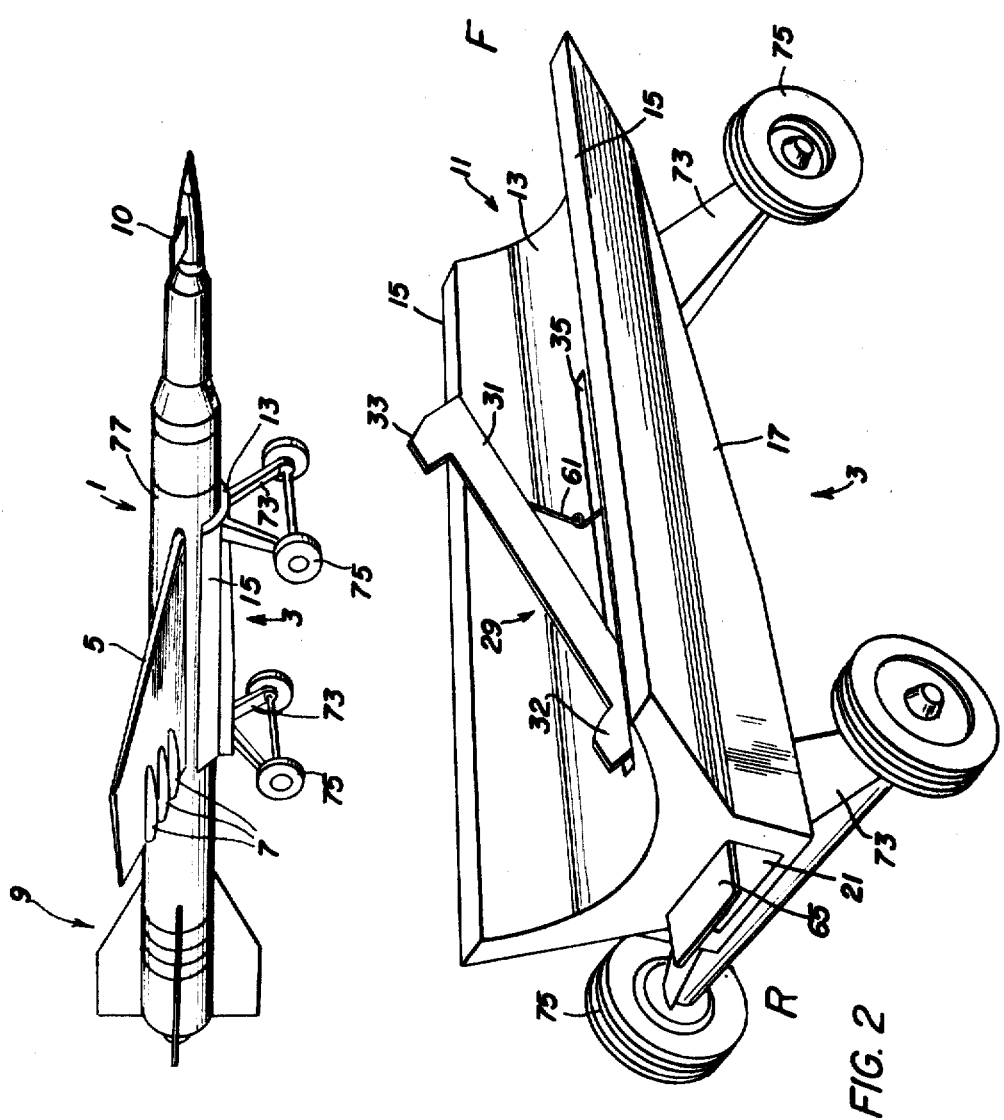
INVENTORS
Dario Manfredi
Angelo Raiti
Peck + Peck
ATTORNEYS

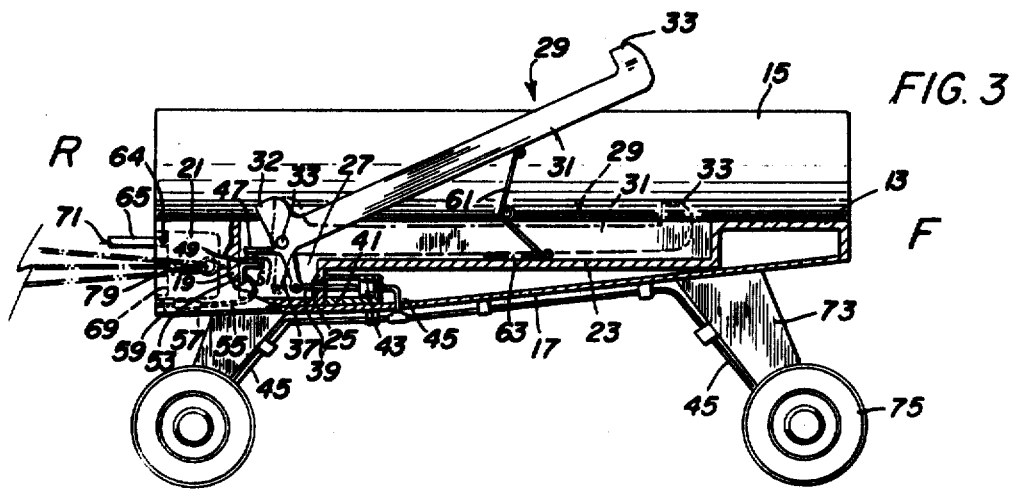
FIG. 3
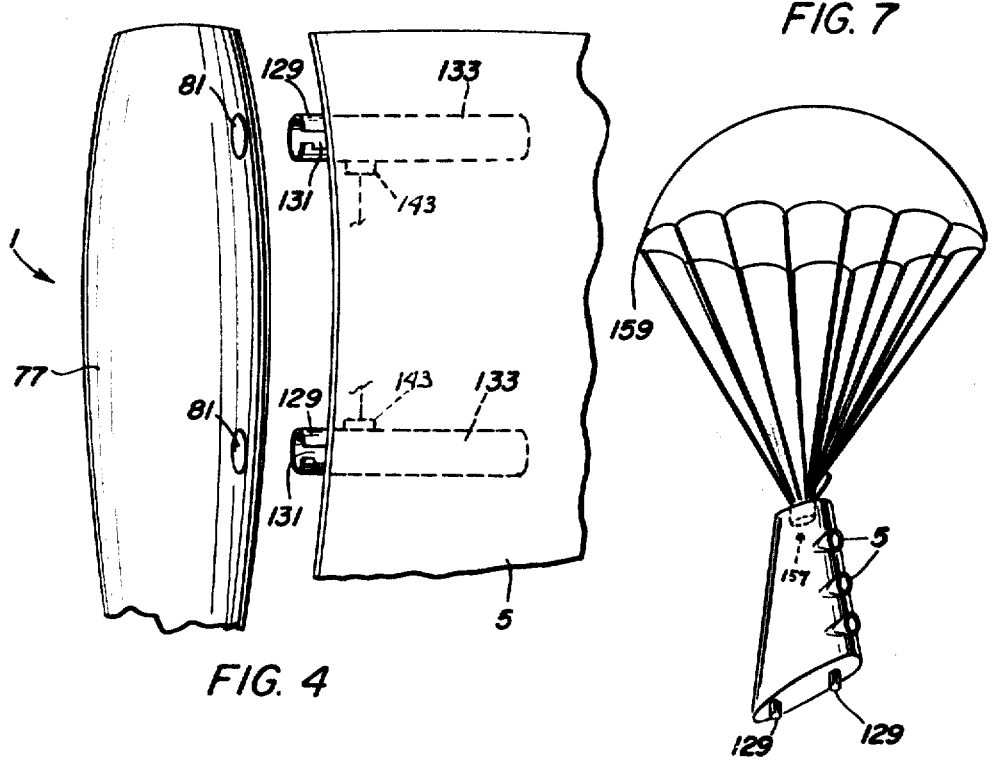
FIG. 4
FIG. 7
INVENTORS
Dario Manfredi
Angelo Raiti
Pech + Pech
ATTORNEYS April 8, 1969 D. MANFREDI ET AL 3,437,285
SPACE VEHICLE AND LAUNCHING MEANS THEREFOR
Filed Aug. 4, 1966 Sheet 3 of 3

INVENTORS
Dario Manfredi
Angelo Raiti
Pech & Pech
ATTORNEYS

United States Patent Office 3,437,285
Patented Apr. 8, 1969

3,437,285
SPACE VEHICLE AND LAUNCHING MEANS
THEREFOR
Dario Manfredi, 43—38 48th St., Woodside, N.Y.
11377, and Angelo Raiti, 40—16 Ithaca St., Elmhurst, N.Y. 11373
Filed Aug. 4, 1966, Ser. No. 570,326
Int. Cl. B64f 1/04; F41f 7/00
U.S. Cl. 244—1                                          11 Claims

ABSTRACT OF THE DISCLOSURE

Apparatus for launching a space vehicle for travel in stratospheric altitudes comprising a mobile launching platform upon which the space vehicle rests in takeoff and automatically lifts therefrom when the desired takeoff speed is attained. The mobile launching vehicle includes means automatically applying brakes thereto and for ejecting a retarding parachute therefrom. The space vehicle includes apparatus operable when stratospheric altitudes are reached for detaching the wings therefrom and for automatically causing rocket means in the wings to be discharged to insure that the wings are fully projected from the fuselage of the space vehicle, and a parachute is ejected from each wing for its relative safe descent to the ground.

---

Figure 5:
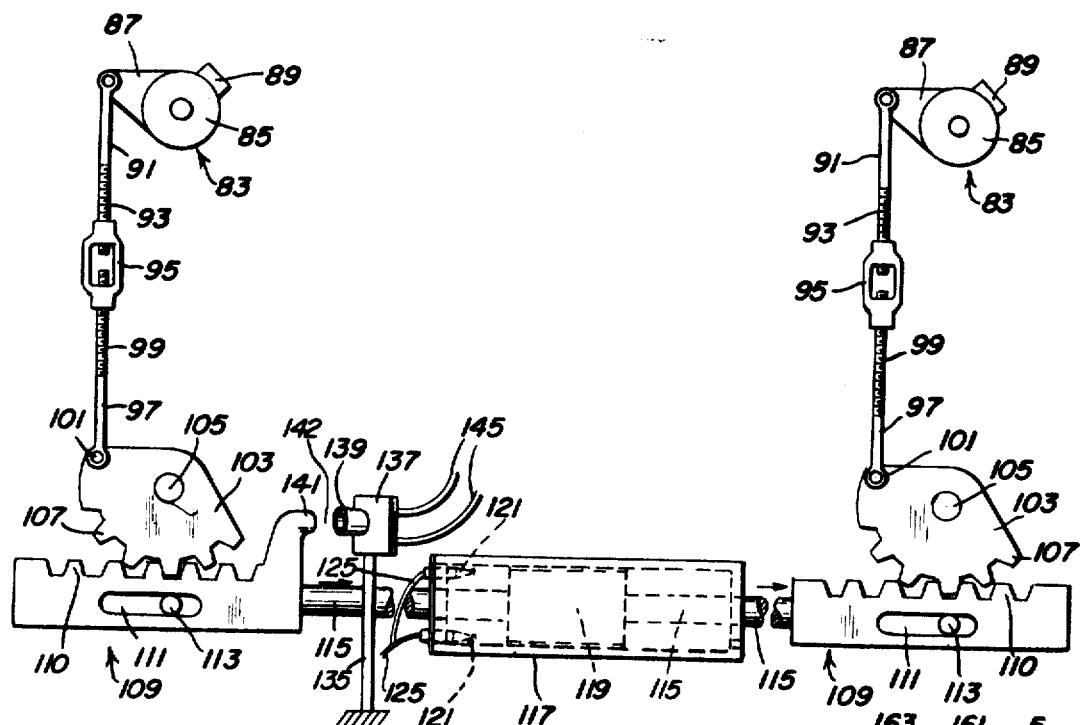

This invention relates broadly to the art of the launching and transmission of missiles, space vehicles and the like for travel into and in the stratospheric altitudes, and in its more specific aspects it relates to weight reduction of such vehicles by ingenious launching means, as well as by mechanism whereby the operational elements of the missile, space vehicle or the like, are released upon reaching the stratospheric altitudes, for further travel of the missile, space vehicle or the like therein; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

It has been one of our prime objects in the development of this system to substantially reduce the weight of the missile, space vehicle, or the like, so that its travel in stratospheric altitudes will not be retarded, or effected, by undue weight which may be caused by operational and launching mechanisms which are not needed when such altitudes are reached.

It will be recognized that any means and arrangement which provides substantial weight reduction resutls in reduction of the power that is required, and the speed of the missile, space vehicle, or the like, may be increased to missile velocity. Not only does this weight reduction provide the above desired characteristics but it also substantially increases the payload capability of the object being launched and flown into the stratosphere.

It is, therefore, one of our objects to provide a space vehicle of the general character in which we are interested which may, for instance, be used for transporting sectional parts or the like for building on a planet, or equipment of any type for those who may have been previously landed on a planet.

As is well known, in air vehicles and the like, a conventional aircraft landing gear is used for both take off and landing. Obviously, such gear is of substantial weight and constitutes a substantial drawback which is undesirable to carry on a missile, space vehicle, or the like, which is designed for travel in the stratospheric altitudes.

In eliminating this unnecessary weight which results from the usual, or any type, of landing gear, we have provided a missile launching platform which upon takeoff of the missile, space vehicle, or the like, is automatically separated therefrom so that such airborne missile, space vehicle, or the like is not retarded or otherwise affected by the unnecessary weight of a landing gear.

In furthering our invention, such missile launching platform which is automatically disengaged from the missile, space vehicle, or the like on the takeoff thereof, is provided with means automatically operable for bringing such missile launching platform to a reduced speed from the high takeoff speeds and finally to a complete halt.

The missile, space vehicle, or the like, which we have developed is caused to travel into the stratospheric altitudes by conventional wings with fuel capacity for the air breathing jet engines which are installed thereon. When the missile, space vehicle, or the like, reaches an altitude which is sufficiently high to avoid substantial air resistance, we have provided means which is actuable to cause the release of the conventional wings from the body of the object, and we have further means which is automatically operable upon release of the wings to cause such wings to rapidly and surely be removed from the body, and we have provided further means which is automatically operable for releasing a parachute from the wings for the relatively slow and safe descent thereof to the earth.

The missile, space vehicle, or the like is provided with a rocket engine of greatly reduced power requirements which is ignited to increase the speed of the object to missile velocity.

With the foregoing general objects, features and results in view, as well as certain others which will be apparent from the following explanation, the invention consists in certain novel features in design, construction, mounting and combination of elements, as will be more fully and particularly referred to and specified hereinafter.

Figure 6:
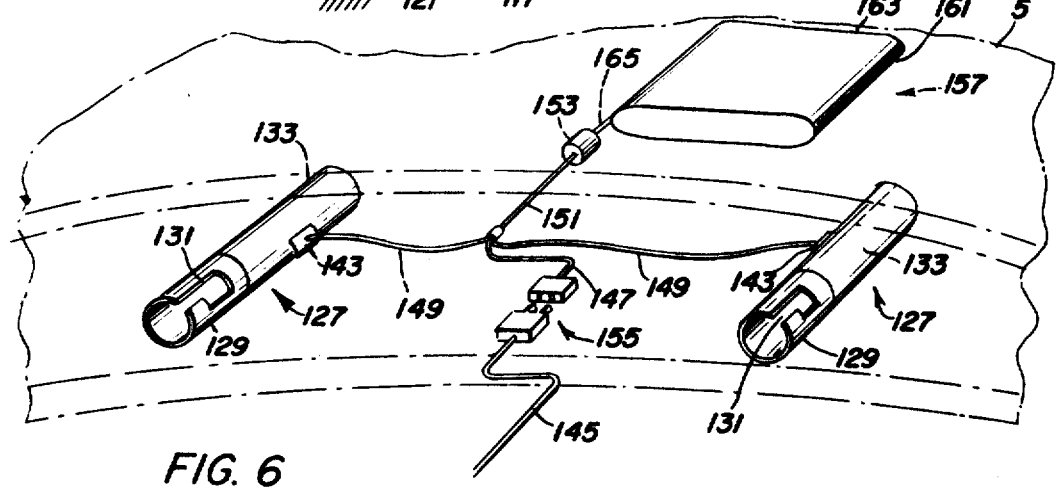

Referring to the accompanying drawings:
FIG. 1 is a view in perspective of our missile, space vehicle, or the like, mounted on the missile launching platform in readiness for launching for travel into the stratospheric altitudes.
FIG. 2 is a view in perspective of the missile launching platform.
FIG. 3 is a view in side elevation, with parts thereof in section, of the missile launching platform, and illustrating operating mechanism for releasing a motion retarding parachute, and for applying braking action to the launching platform.
FIG. 4 is a view illustrating one of the conventional wings of the missile, space vehicle, or the like, upon being automatically released from the body of such missile, space vehicle, or the like, when stratospheric altitudes have been reached.
FIG. 5 is a diagrammatic view illustrating the mechanism which is actuated for releasing the conventional wings from the body of the missile, space vehicle, or the like.
FIG. 6 is a view in perspective disclosing a wing and the retro-rocket chambers and parachute housing on the wing, and the electric circuit for actuating these various components when the wing is released from the body of the missile, space vehicle, or the like.
FIG. 7 is a view illustrating a wing which has been released from the body of the missile, space vehicle, or the like, with the wing parachute in open operative position for the relatively slow and safe descent of the wing to the ground.

FIG. 8 is a detail view of a further form of wing locking and release mechanism.

In the accompanying drawings, and particularly FIG. 1 thereof, we have used the numeral 1 to designate in its entirety the missile, space vehicle, or the like, and the numeral 3 to designate generally the mobile launching platform upon which the missile, space vehicle, or the like, is cradled during travel for the takeoff from the ground. The missile, space vehicle, or the like, 1 is provided with a pair of conventional, or any suitable type of, wings 5 which mount any suitable number of propelling means such as jet or air breathing engines 7 on the trailing edge thereof. The missile, space vehicle, or the like, may, if found desirable, be provided with any suitable empennage 9. Stabilizing fins 10 may, if desired, be provided on the nose of the space vehicle.

Hereinafter in the specification and claims, we shall refer to the missile, space vehicle, or the like, as the space vehicle 1, and it will be understood that this designation includes any object of this character which adapted to travel into the stratospheric altitudes, and is provided with the operating and launching means to be described and explained hereinafter.

As will be appreciated from consideration of FIG. 1 of the drawings the space vehicle 1 prior to take off from the ground is mounted and supported in a cradling manner on the mobile launching platform 3 and, as will be explained hereinafter, the combination of the space vehicle, and the launching platform, is propelled along the ground until takeoff speed is attained by means of the jet engines or other power means, whereupon the space vehicle 1 lifts, or takes off, from the launching platform 3 for its travel into the stratospheric altitudes, and upon reaching such altitudes the wings 5 with the fuel carried therein and the air breathing jet engines are automatically released from the space vehicle, as will be described.

The launching platform 3 comprises a body designated in its entirety by the numeral 11, which body is of generally elongated concave construction to provide a concave supporting surface 13 for receiving a portion of the length of the space vehicle 1 which is supported and cradled therein for ground takeoff. Extending upwardly and diverging outwardly from the bed or cradle concave portion 13 of the mobile launching platform are side walls 15 which, when the space vehicle is supported on the mobile launching platform 3, maintains it against lateral movement with respect to the launching platform.

Fixed to, or integrally formed with and depending from the cradle or concave portion 13 of the mobile launching platform, is a housing which we have designated by the numeral 17. Such housing preferably is of tapering or narrowing depth formation from the rear of the mobile launching platform to the front thereof. We have designated the front of the mobile launching platform with the letter F and the rear end thereof by the letter R. The housing 17 is preferably of compartmented construction and is provided with a wall 19 adjacent to but forwardly spaced from the rear wall thereof to provide a parachute housing or compartment 21. The interior of the housing 17 is provided with an inner floor portion 23 positioned above the exterior floor or bottom of the housing, and this inner floor portion 23 extends rearwardly and then downwardly as at 25 providing a well 27 for a purpose which will be hereinafter described.

An actuating lever designated in its entirety by the numeral 29 is pivotally mounted within the mobile launching platform and functions for the purposes and in a manner which will be described in detail as this description proceeds. The actuating lever comprises an elongated portion 31 provided with an upstanding nose 33 on the forward end thereof. At the opposite end the elongated body portion 31 of the actuating lever 29 is pivotally supported by means of a pivot pin 33 which is journaled in and extends between the side walls of the housing 17. The cradle or concave portion 13 of the mobile launching platform is slotted as at 35 and the actuating lever 29 extends through and pivots into this slot 35. The lower or rear end of the elongated body section 31 is in the form of a crank 32 providing a depending crank arm 37 which operates in the well 27, and to the lower end of this crank arm 37 is pivotally fixed a piston rod 39 which extends through the wall 25 and into a cylinder 41, which contains any suitable type of hydraulic brake fluid. On the forward end of the piston rod 39 is fixed a piston 43. Hydraulic fluid is forced from the master cylinder 41 when the piston 43 is moved forwardly in the cylinder, and such fluid passes through a series of fluid carrying lines 45 to individual cylinders for causing brake action on the wheels of the mobile platform in a manner well known in the braking arts.

Extending rearwardly from the crank 32 is an arm 47 having on its undersurface one terminal 49 of an electric switch. The other terminal 51 of the switch is mounted on a bracket 53 which is fixed to the forward side of the wall 19. Thus, when the terminals 49 and 51 are in closed or contacting position as illustrated in FIG. 3 of the drawings, an electrical circuit is closed and through the electric cable 55 a solenoid 57 is energized to retract its armature 59 for a purpose to be described.

Any suitable type of biasing means is provided for urging the actuating lever 29 into operative raised position as disclosed in FIG. 3 of the drawings, and such biasing means may comprise a spring means 61 which, when the actuating lever 29 is in lowered position as illustrated in dotted lines in FIG. 3, folds into a recess 63 which is provided in the inner floor 23 of the housing 17. It is to be understood that we may use other types of biasing means rather than a spring, for instance, hydraulic or the like means may be used.

The terminals 49 and 51 of the switch are connected into any suitable electric circuit in a well known manner, and such circuit may, if desired, be powered by batteries.

The parachute housing or compartment 21 is closed at its rear end by means of a door 65 which is hinged as at 64, which hinge is provided with any suitable biasing means which at all times urges the door from closed position to open position. The closed position of the door being disclosed by the dotted lines 69 in FIG. 3 of the drawings. On the edge of the door opposite the edge at which it is hinged is a lug 71 having an eye therein into which the armature 59 extends when the door is closed. It will be understood that since the armature is sufficiently long it will accomplish the aforesaid locking action.

The mobile launching platform 3 is mounted, for travel along a runway in any suitable manner, as by means or struts 73 which mount wheels 75, it being understood that each wheel is provided with a hydraulic brake cylinder which is fed by the pipe lines 45 when the piston 43 is moved forwardly in the cylinder 41, in a manner which will be hereinafter described.

As is illustrated especially in FIG. 1 of the drawings, it will be recognized that when the space vehicle 1 is in readiness for travel over the runway for takeoff for travel into the stratospheric altitudes, it is mounted on the mobile launching platform 3, as disclosed. A length of the body 77 of the space vehicle is cradled in the concave body portion 13 of the mobile launching platform, and the body 77 of the space vehicle depresses or pivots the actuating lever 29 into its lowermost position within the slot 35, as shown in dotted lines in FIG. 3 of the drawings. The downward pivoting of the actuating lever on its pivot 33 swings arm 47 upwardly to break the electrical contact between the terminals 49 and 51 of the electrical switch. Such downward pivoting of the actuating lever also results in a rearward swinging action of the crank arm 37 to thereby retract the piston 43 in the master cylinder 41.

With the space vehicle mounted on the mobile launching platform as described and disclosed, the mobile launching platform will travel over the takeoff runway with the space vehicle, since the space vehicle is provided with any suitable and desirable projection (not shown) on the lower surface of its body 77, which engages with the nose 33 on the actuating lever to cause forward travel of the mobile launching platform with the space vehicle until takeoff speed has been reached.

When take-off speed has been reached, the space vehicle rises from its cradled position on the mobile launching platform for its travel to and into the stratospheric altitudes. When this lifting of the space vehicle occurs, and it leaves its position on and supported by the mobile launching platform, the actuating lever 29 will be freed from the weight of the supported space vehicle, whereupon the actuating lever under the action of the biasing means 61 will be pivoted upwardly into the full line position shown in FIG. 3 of the drawings. Thus, the rearwardly extending arm and its contact 49 will swing downwardly with the said contact coming into electric circuit closing contact with the terminal 51 of the electric switch, to close the circuit to the solenoid 57, energizing the same to withdraw the armature 59 from its locking position in the eye of the projection 71 of the door 65. The door will thereupon swing to open position under the action of any suitable spring means on the hinge 64. The parachute 79 which is contained within the compartment 21 will be released, or pulled from the compartment under the action of the rearward thrust occasioned by the rapid forward movement of the mobile launching platform. The parachute when fully removed from its housed position within the compartment will open to cause a slow-down of the forward movement of the mobile launching platform. Simultaneously with the closing of the electric switch to close the circuit to the solenoid 57, the arm 39 will be swung forwardly moving the piston 43 forwardly in the hydraulic cylinder 41, to force braking fluid through the fluid lines 45, to the individual wheel brakes to cause an additional means for slowing down or retarding the forward movement of the mobile launching platform.

Through the combined action of the parachute and the brakes the mobile launching platform will have its rapid forward travel retarded and then stopped, damage will be prevented and the mobile launching platform may be used many more times in the launching of space vehicles.

It will now be appreciated, that we have provided launching means which eliminates the need for any type of landing gear on the space vehicle, and have thus, lightened the space vehicle in an important and significant manner. In accomplishing this weight reduction purpose, we have not made the takeoff of the space vehicle difficult, cumbersome or impractical, nor have we added substantially to the cost of the launching means.

On each side of the body 77 of the space vehicle 1, we form a plurality of longitudinally spaced apart openings or apertures 81, and while we show two of such apertures in the drawings, it is to be understood that more may be used if found desirable. The apertures 81, in a manner to be described, are adapted to removably receive fittings fixed to the wings of the space vehicle, and as we have stated above, it is likely that more than two such wing supporting fittings would be used, but we have shown two for each wing, purely for purposes of simplifying this description and disclosure.

In FIG. 5 of the drawings, we have disclosed schematically, the mechanism which is operated by the pilot of the space vehicle when it reaches the stratospheric altitudes, and it is desired to drop or release the wings, with their contained fuel and propulsion means, since the air resistance is so substantially reduced that the wings are no longer required for travel in these altitudes. The mechanism illustrated in FIG. 5 of the drawings is mounted in any suitable manner within the body 77 of the space vehicle 1.

We have used the numeral 83 to designate in their entirety, rotary locking members, which are operative with the wing fittings to release the latter, in a manner which will be explained, when the space vehicle reaches the stratospheric altitudes. The members 83 are rotatively mounted in the body 77 in any suitable, desirable and well known manner, each being positioned adjacent an aperture 81 for lockably and releasably receiving a wing fitting.

The rotary locking members each comprises a rotary body 85, having a crank segment 87 extending from a part of the periphery thereof, and a locking lug 89 extending from a different arc of said periphery. Pivotally fixed to and extending from the tail of the crank segment is a rod 91 which is threaded for a distance on one end thereof, as at 93. A turnbuckle 95 is threaded on the threaded end of the rod 91. Threaded into the other end of the turnbuckle is a rod 97, one end of which is threaded, as at 99, for attachment to the turnbuckle. The other end of the rod 97 is pivotally connected, as at 101, to a gear segment 103, which is pivotally mounted, as at 105, in any suitable manner to the body 77 of the space vehicle 1. Teeth 107 are formed on the curved periphery of the gear segment. For each gear segment, we provide a rack, designated generally by the numeral 109, each such rack being slotted, as at 111, into which extends a support rod 113, which is fixed in the body 77 of the space vehicle and allows each rack to slide on the rod in its operation under the actuation of its respective gear segments 103. Each rack is provided with teeth 110 in mesh with teeth 107.

Each rack 109 has fixed to an end thereof an actuating rod 115, the rods 115 extend from each rack toward a centrally disposed cylinder 117. Each rod 115 slidably extends into the cylinder 117 and the end of each rod is connected to a piston 119 which is slidably positioned within the cylinder 117. Positioned within an end of the cylinder 117 are one or more squids or explosive charges 121 which are ignited by any suitable electric igniting means which receives its electric igniting charge from electric cables 125 which extend to, and for access to the pilot of the space vehicle. Thus, when the pilot closes a circuit, by any suitable means such as a pushbutton, or the like, through the cables 125 the explosive charges or squids are set off or exploded. When this occurs the pressure of the explosion moves the piston 119 to the right to thereby move each of the rods 115 in the direction of the arrows in the drawing.

Instead of the rod and turnbuckle connection between the rotary locking members and the gear segments, it is within our contemplation to use, for instance, a chain mounted over a sprocket on members 83 and one on the gear segment, and extending therebetween.

Each wing 5 is provided with at least two tubular members designated generally by the numeral 127, such tubular members being spaced apart chordwise of the wing. The tubular members are fixed in any suitable manner within the wing so that an open ended tubular fitting section 129 projects from the root edge or end of the wing. As will be explained, the sections 129 form the female components of the mechanism for releasably locking the wings to the space vehicle 1. Each female fitting section 129 is formed with a bayonet slot 131 therein. The rear portion 133 of the tubular members mount therein rockets for a purpose to be explained.

When the wings 5 of the space vehicle are to be releasably attached to the body 77 thereof, the projected tubular female fittings 129, which project outwardly from the root end of the wings, are positioned within the apertures 81 in the body 77. Since one of the rotary locking members 83 is positioned adjacent each aperture 81 in position therein so that the locking lugs 89 will be in alignment with the longitudinal portions of the bayonet slots 131, the wings may be pushed toward the space vehicle and the lugs will ride into said longitudinal portions of the bayonet slots. When the lugs 89 reach the inner end of the longitudinal portions of the bayonet slots the lugs 89 may be moved into the transverse locking area of the bayonet slots by adjusting the rod 91 in the turnbuckle 95, whereupon the lugs 89 will be locked in the bayonet slots. Thus, the space vehicle, with the wings releasably attached thereto, is in the proper condition for travel through the atmosphere and into the stratospheric altitudes and when such altitudes are reached the wings are automatically released from the space vehicle in the following manner.

When such stratospheric altitudes are attained the pilot of the space vehicle, through any convenient and well known electrical switch closing means, energizes the squids which sets off the explosive charges to force the rods 115 in the direction of the arrows in FIG. 5 to thereby move each rack 109 in the same direction. Such movement of the racks, sliding on the supporting rods 113, causes rotation of the gear segments 103 which in turn, through the connecting rods between the gear segments and the rotary locking members 83, causes the rotary bodies 85 to rotate to thereby move the locking lugs 89 from the transverse locking area of the bayonet slots and into the longitudinal area of the bayonet slots.

A bracket 135 is fixed in any suitable manner to the fuselage or body F of the space vehicle and extends upwardly therefrom and mounts on its upper end an electric switch 137 having a collar 139 which projects toward the adjacent rack 109. The bracket 135 is provided with an aperture, or any suitable opening, through which the rod 115 slidably extends. The adjacent rack 109 is formed with a nose or projection 141 which, moves toward and enters the collar 139 when the explosive charges 121 are ignited to move the rods 115 and each rack 109 in the direction of the arrows in FIG. 5. When the nose or projection 141 extends into the collar 139 the switch 137 is closed to cause the rockets 133 to be exploded through the igniting devices 143 which are energized upon closing the switch 137 through the electric circuit including the cables 145, 147 and 149, and to cause through electric cable 151 energization of the solenoid 153 for a purpose to be described. The nose 141 may have an insulated end 142 which actuates a switch arm to close the switch 137 when nose 141 is in the collar 139.

It will now be appreciated that the closing of the switch 137 is practically simultaneous with the movement of the lugs 89 to release the wings from the body 77 of the space vehicle. Thus upon release of the wings and closing of the switch 137, the rockets 133 are fired to push the wings away from the space vehicle, and upon this occurrence and simultaneously therewith the solenoid 153 is energized. We provide any suitable type of plug and socket connection 155 so that upon release of the wings from the fuselage, the wing carried electrical means will be disconnected from the electric circuit of the space vehicle. When the switch 137 is closed, due to the movement of the nose 141 into the collar 139 of the switch, the igniting devices 143 are energized to cause firing of the rockets 133. This energization of the igniting devices 143 is caused by the closing of the switch 137 to close the circuit through the cables 145, the plug and socket connection 155, the cable 147 and the cables 149, one of which is connected to one igniting device 143 while the other is connected to the other igniting device 143.

In each wing 5 we provide a housing which has been designated in its entirety by the numeral 157. This housing 157 is preferably of generally rectangular configuration and is adapted to store a parachute 159 (FIG. 7). Each parachute housing 157 has a door on the outer edge thereof which is coincident with the outer edge of each wing so when the door on the housing opens the interior of the housing is opened to the atmosphere as is clearly illustrated in FIG. 7 of the drawings. The door 161 is hinged as at 163, by any suitable means which biases or constantly urges the door towards open position. The door is provided with any suitable latching or locking means through which the armature 165 of the solenoid 153 extends to normally maintain the door of the housing in closed position.

When the switch 137 is closed to complete a circuit as we have described above, the solenoid 153 is energized through cable 145, connecting elements 155, cables 147 and 151 to thereby retract the armature 165 to withdraw it from the latching arrangement to permit the door 163 to swing open so that the parachute 159 will be drawn from the housing by the suction of the air and thereby extend into operative position as shown in FIG. 7, so that the wings 5 will descend safely and slowly to the ground.

In many instances four, instead of two, connecting means will be necessary for releasably locking each wing 5 to the body 77 of the space vehicle 1. When four connecting means are used instead of the two tubular members 127 which are disclosed in FIG. 6 of the drawings, we shall have four of such tubular members, and the additional two tubular members which will be exactly the same as the tubular members 127 will be mounted within the wing with the connecting sections 129 projecting therefrom, and these two additional tubular members will be spaced directly below the tubular members 127 illustrated in FIG. 6 of the drawings. Similarly, the body 77 of the space vehicle will be provided with two additional apertures 81 in alignment with the two additional tubular members 127. The locking and releasing means which, coacts with the two additional tubular members 127, comprises the rotary locking members 83a comprising the rotary members 85a and the locking lug 89a. The rotary locking members 83a are the same as the members 83 illustrated in FIG. 5 of the drawings, and these rotary locking members 83a are fixed to the gear segments 103a which correspond to the gear segments 103 of FIG. 5 of the drawings. The gear segments 103a are provided with teeth 107a which are in mesh with the teeth 110a on the rack 109a.

In the use of four instead of two coactive locking and releasing means each gear segment 103, as illustrated in FIG. 5 of the drawings, would amount for rotation therewith a rotary locking member 83a as illustrated in FIG. 8 of the drawings. Thus, when the racks 109 were moved, as explained, with respect to the cylinder 117 the gear segments 103a would be rotated with similar rotation of the rotary locking members 85a and through the connecting means the rotary locking members 85 would be simultaneously rotated to unlocking position in the longitudinal slot of the bayonet slots so that the wings would be released from the body 77 of the space vehicle.

We claim:

1. A space vehicle and launching means therefor, including in combination, wings on said space vehicle releasably locked to the body thereof, coactive means on said wings and the body of the space vehicle for releasably locking the wings thereto, means operable from the body of the space vehicle and connected with said coactive means for actuating said coactive means to release said wings from the space vehicle, and a mobile launching platform, said mobile launching platform including a supporting surface for supporting said space vehicle during travel on the ground prior to takeoff of the space vehicle, and on takeoff said space vehicle separating from said mobile launching platform, rockets being mounted in said wings, firing means for said rockets, and said firing means being connected to and ignited when said means which is operable from the body of the space vehicle is operated.

2. A mobile launching platform adapted to support a space vehicle in its travel over the ground prior to takeoff, said mobile launching platform including means automatically operable to operative position upon takeoff of said space vehicle therefrom to retard and stop movement of said mobile launching platform, and said means including a pivotally mounted member maintained in inoperative position by engagement with the space vehicle, biasing means connected with said pivotally mounted member and operable to pivot said member to operative position when disengaged from the space vehicle, said mobile launching platform being provided with a parachute housing, containing a parachute and being provided with closure means therefor, releasable locking means for said closure, and said pivotally mounted member when in operative position connected to and causing actuation of said releasable locking means for the closure to release the locking means for opening of the closure and passage of the parachute from the parachute housing.

3. A mobile launching platform in accordance with claim 2, wherein wheels are provided for mounting said mobile launching platform, and braking means for said wheels is provided and actuated to wheel braking position when said pivotally mounted member is in operative position.

4. A mobile launching platform in accordance with claim 2, wherein an electric switch is provided which is electrically connected to a solenoid providing a releasable locking means for said closure, and said pivotally mounted member includes an elongated body portion mounting one terminal of the electric switch, and said terminal making contact with the other terminal of the electric switch to close the circuit to the solenoid to release the locking means when said elongated portion is pivoted upwardly to operative position, and when said elongated portion is pivoted downwardly to inoperative position said first mentioned terminal being disconnected from said second mentioned terminal to open the circuit to said solenoid.

5. A space vehicle adapted to be supported on a mobile launching platform during its travel over the ground and prior to takeoff, said space vehicle provided with wings releasably locked thereto and adapted to be released therefrom when the stratospheric altitudes are reached, means for locking and releasing the wings, said means including fittings projecting from the root edge of each wing and inserted in said space vehicle, mechanism within said space vehicle and controlled from said space vehicle and engageable with said fittings and operable to position engaging and locking said fittings in locked position within the space vehicle and to position disengaging and releasing said fittings from said mechanism for release of the wings from the space vehicle and said mechanism including a single rotary locking and releasing member for each fitting and a single actuating means connected to each of said members and operable to cause simultaneous operation of said members, and an electrically ignited explosive charge provided and causing operation of said single actuating means.

6. A space vehicle in accordance with claim 5, wherein said fittings are provided with bayonet slots and said members are each provided with a lug operable in said bayonet slot of its respective fitting to locking and releasing positions, and said actuating means causes simultaneous rotation of said lugs to fitting releasing position for release of the wings from the space vehicle.

7. A space vehicle in accordance with claim 5, wherein said mechanism includes a rack, a gear segment in mesh with said rack and operated thereby when said rack is moved, said gear segment being operatively connected with a rotary member to cause rotation thereof, there being a gear segment and rack for each rotary member, and means connected to each rack and operable to cause simultaneous operation of each rack.

8. A space vehicle in accordance with claim 5, wherein said mechanism includes racks, gear segments in mesh with said racks and operated thereby when said racks are moved, certain of said members being fixed on said gear segments for movement therewith, each gear segment being operatively connected with one of the other members, and means connected to each rack and operable to cause simultaneous operation of each rack.

9. A space vehicle in accordance with claim 5, wherein each wing is provided with a parachute housing having closure means therefor, and a parachute therein, and each wing is provided with rockets, and said mechanism includes an electric switch, said switch being closed when said mechanism is operated, said closure means being provided with a lock and said lock being electrically connected with said switch for releasing said lock when the switch is closed, and said rockets being provided with igniting means connected to said switch and energized when the switch is closed.

10. A space vehicle having a body and launching means for said body, including in combination, wings on said space vehicle releasably locked to the body thereof, coactive means on said wings and the body of the space vehicle for releasably locking the wings thereto, means operable from the body of the space vehicle and connected with said coactive means for actuating said coactive means to release said wings from the space vehicle, each of said wings being provided with a parachute housing containing a parachute, closure means provided for each housing, and releasable closure locking means being connected to each closure means and to said means which is operable from the body of the space vehicle, said releasable closure locking means being actuated to closure release position upon actuation of said means which is operable from the body of the space vehicle, and a mobile launching platform including a supporting surface for supporting said space vehicle during travel on the ground prior to takeoff of the space vehicle, and on takeoff said space vehicle separating from said mobile launching platform.

11. A mobile launching platform adapted to support a space vehicle in its travel over the ground prior to takeoff, said mobile launching platform including means automatically operable to operative position upon takeoff of said space vehicle therefrom to retard and stop movement of said mobile launching platform, and said means including a pivotally mounted member maintained in inoperative position by engagement with the space vehicle, biasing means connected with said pivotally mounted member and operable to pivot said member to operative position when disengaged from the space vehicle, and said pivotally mounted member including an elongated body portion adapted to contact and be downwardly pivoted to inoperative position when engaged by the space vehicle and said elongated body portion having a depending crank arm on the lower end thereof operatively connected with a cylinder containing hydraulic fluid and operable when said space vehicle takes off and said elongated body portion is upwardly pivoted to operative position to force fluid to said wheels for causing a braking action.

References Cited

UNITED STATES PATENTS

| | | | |
|---|---|---|---|
| 1,627,184 | 5/1927 | Krammer | 244—2 |
| 2,210,449 | 8/1940 | Fleet et al. | 244—63 X |
| 2,283,223 | 5/1942 | Nallinger | 244—43 |
| 2,416,104 | 2/1947 | Lerche | 244—43 X |
| 2,604,279 | 7/1952 | Gerin | 244—63 |
| 2,774,557 | 12/1956 | Jakimiuk | 244—63 |

FERGUS S. MIDDLETON, *Primary Examiner.*

U.S. Cl. X.R.

89—1.819; 244—63